Patented Dec. 7, 1948

2,455,415

UNITED STATES PATENT OFFICE 2,455,415

ULTRAVIOLET EMITTING MAGNESIUM PYROPHOSPHATE PHOSPHOR

Herman C. Froelich, Cleveland Heights, Ohio, assignor to General Electric Company, a corporation of New York No Drawing. Application April 15, 1947, Serial No. 741,692

3 Claims. (Cl. 252—301.4)

My invention relates to phosphors, that is, fluorescent or phosphorescent materials. More particularly, my invention relates to inorganic phosphors which emit ultraviolet radiations of longer wave length when excited by ultraviolet radiations of shorter wave length. The material may, therefore, be applied as a coating on the inner surface of the envelope of a low-pressure mercury discharge lamp wherein the radiation of 2537 Å. produced by the discharge is converted by the phosphor to ultraviolet radiations of longer wave length.

According to the present invention, I have discovered a new ultraviolet phosphor of considerable brightness consisting of a matrix of magnesium phosphate activated by both cerium and thorium, the cerium being in trivalent form. For best results the matrix should be closed to pyrophosphate, $Mg_2P_2O_7$, rather than to orthophosphate, $Mg_3(PO_4)_2$, composition.

The emission of magnesium pyrophosphate activated with cerium alone appears to be typically that of the trivalent cerium ion, consisting of two main bands lying so close together that they are unresolved at room temperature, but split into two or more bands at liquid nitrogen temperature. Due to the particular field afforded by the magnesium pyrophasphate matrix, the peak of emission is displaced toward 3400 Å. compared with a peak of about 3600 Å. for the cerium-activated calcium phosphate disclosed and claimed in the Roberts Patent 2,306,567 which is assigned to the same assignee as the present application.

The further addition of small amounts of thorium (a few tenths of 1%) sentizes the emission greatly, producing phosphors with much greater intensity of emission. Simultaneously, the peak of emission is shifted toward longer wave lengths with increasing concentration of thorium. Thus the peak of emission with phosphors having 12 or more per cent $ThO_2$, weight lies at about 3550 Å. The thorium may be added in widely varying amounts from a nominal amount of .001% to amounts considerably in excess of 12% $ThO_2$, say 15% or more. Likewise, the cerium may be present in nominal amounts of, say, .001 to 25% $Ce_2O_3$.

Thorium alone, as activator for magnesium pyrophosphate, causes a weak emission with apparently two peaks, one in the ultraviolet at 3500 Å., and the other in the visible at 4300 Å. The ultraviolet peak itself may be split in two when the phosphor is excited at the temperature of liquid nitrogen.

As compared with the intensity of single-activated cerium and single-activated thorium phosphors, the intensity of double-activated cerium-thorium phosphors is considerably greater than the sum of intensities of these single-activated materials.

A phosphor comprised in the present invention and containing of the order of 13% $Ce_2O_3$ and 12% $ThO_2$ has given a brightness of about 135% in terms of the cerium-activated calcium phosphate phosphor disclosed in the above-mentioned Roberts patent.

The phosphor may be prepared by cold co-precipitation of magnesium, cerium and thorium phosphates as magnesium ammonium phosphate, $MgNH_4PO_4$, plus activators, followed by firing at about 900–1200° C. in steam and hydrogen. During the firing, the ammonium-containing compounds are decomposed under formation of activated magnesium pyrophosphate, $Mg_2P_2O_7$.

More particularly, a suitable material may be prepared as follows: 510 grams $Mg(NO_3)_2 \times 6H_2O$, 118 grams $Ce(NO_3)_3 \times 6H_2O$ and 90 grams $Th(NO_3)_4 \times 4H_2O$ are dissolved in 2 liters of distilled water. To this solution is added, under vigorous agitation, a cold solution of 400 grams of diammonium phosphate, $(NH_4)_2HPO_4$, in 2 liters of distilled water, followed by about 400 cc. of concentrated ammonia. The phosphate represents an excess over theoretical requirement. After some standing, the finely crystalline precipitate is filtered, washed, dried, then fired in an atmosphere of much steam and some hydrogen, for 1 hr. at 1050°. After cooling in hydrogen and sieving, the phosphor is ready for use.

Modifications of the above method, as well as different methods such as synthesis, may be used to produce the phosphor. In contrast to the cerium-activated calcium phosphate phosphor, there is no strong reduction of the pyrophosphate to orthophosphate during the steam-hydrogen firing. Substantially all magnesium pyrophosphate survives the steam-hydrogen fire as such, at the temperatures indicated.

Optimum firing temperature was found to be about 1050° C., with a range of 900–1200°, more or less being possible. Brightness, hardness, density, and sintering of the powders tend to increase with firing temperature. A firing temperature of 1050° C., represents the best compromise between maximum brightness and fair powder qualities. Firing time is not critical.

Powder qualities could be considerably improved, however, if some silica was added to the phosphor before firing. No reduction in powder brightness was observed with amounts as high as 10% $SiO_2$. On the other hand, Ce-Th activated magnesium silicate phosphor itself showed only very poor response. While a nominal amount of .001% may be used, I prefer to use about 1 to 5% of silica, by weight.

The silica may be added in two ways. In one method, finely divided silicic acid powder is added to the solution of magnesium, etc. nitrates before the phosphates are precipitated. Alternatively, the proper amount of ethyl silicate, dissolved in alcohol, is added to the nitrate solution. Hydrolysis to silicic acid takes place during or after addition of phosphate and ammonia. Other methods are possible.

When silica "doped" phosphors are fired, the silica may remain free, it may form some Mg silicate if MgO should be present in the mixture, or it may form a double compound with the phosphate. At any rate, phosphors containing co-fired silica had much superior powder qualities than "undoped" samples.

The addition of other secondary activators gave no improvement. For instance, bismuth, lead and tin were also tried as activators alone and in combination with thorium, but all resulting phosphors were of very low brightness, e. g., a few per cent of the brightness of the phosphor comprising this invention. The phosphors were also considerably less bright when compounded to give orthophosphate, $Mg_3(PO_4)_2$, after calcination, as compared to the pyrophosphate composition.

What I claim as new and desire to secure by Letters Patent of the United States is:

1. A phosphor consisting essentially of magnesium phosphate of pyrophosphate composition activated by both cerium and thorium in amounts of about .001–25% $Ce_2O_3$ and .001–15% $ThO_2$.

2. A phosphor consisting essentially of magnesium phosphate of pyrophosphate composition activated by both cerium and thorium in amounts of about 13% $Ce_2O_3$ and about 12% $ThO_2$.

3. A phosphor consisting essentially of magnesium phosphate of pyrophosphate composition activated by both cerium and thorium in amounts of about .001–25% $Ce_2O_3$ and .001–15% $ThO_2$, and containing about .001–10% of silica.

HERMAN C. FROELICH.

REFERENCES CITED

The following references are of record in the file of this patent:

UNITED STATES PATENTS

| Number | Name | Date |
|---|---|---|
| 2,049,765 | Fischer | Aug. 4, 1936 |

Certificate of Correction

Patent No. 2,455,415.  December 7, 1948.

HERMAN C. FROELICH

It is hereby certified that errors appear in the printed specification of the above numbered patent requiring correction as follows:

Column 1, line 18, for "closed" read *closer*; line 28, for "pyrophasphate" read *pyrophosphate*; line 36, for "sentizes" read *sensitizes*; line 42, before the word "weight" insert *by*;
and that the said Letters Patent should be read with these corrections therein that the same may conform to the record of the case in the Patent Office.

Signed and sealed this 9th day of August, A. D. 1949.

[SEAL]

THOMAS F. MURPHY,
*Assistant Commissioner of Patents.*